(12) United States Patent
Ali et al.

(10) Patent No.: US 9,652,298 B2
(45) Date of Patent: May 16, 2017

(54) POWER-AWARE SCHEDULING

(71) Applicant: VMware, Inc., Palo Alto, CA (US)

(72) Inventors: Qasim Ali, Santa Clara, CA (US);
Timothy P. Mann, Palo Alto, CA (US);
Haoqiang Zheng, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 193 days.

(21) Appl. No.: 14/167,213

(22) Filed: Jan. 29, 2014

(65) Prior Publication Data

US 2015/0212860 A1 Jul. 30, 2015

(51) Int. Cl.
*G06F 9/50* (2006.01)

(52) U.S. Cl.
CPC .......... *G06F 9/5094* (2013.01); *G06F 9/5088* (2013.01); *G06F 9/5083* (2013.01); *Y02B 60/142* (2013.01); *Y02B 60/162* (2013.01)

(58) Field of Classification Search
None
See application file for complete search history.

(56) References Cited

U.S. PATENT DOCUMENTS

| | | | | |
|---|---|---|---|---|
| 6,397,252 B1 * | 5/2002 | Sadiq | ................... | G06F 9/5083 709/226 |
| 2009/0007108 A1 * | 1/2009 | Hanebutte | ........... | G06F 11/3409 718/1 |
| 2009/0187775 A1 * | 7/2009 | Ishikawa | ............... | G06F 1/3287 713/310 |
| 2009/0187912 A1 * | 7/2009 | Lee | ........................ | G06F 9/4856 718/103 |
| 2009/0249352 A1 * | 10/2009 | Hohensee | ............. | G06F 9/5088 718/105 |
| 2009/0295794 A1 * | 12/2009 | Fan | ........................ | G06F 9/5094 345/419 |

(Continued)

OTHER PUBLICATIONS

Hillar, Core Parking in Windows Server 2008 R2 and Windows 7, Feb. 24, 2010, downloaded from the internet on Aug. 24, 2015 at <url>: http://www.drdobbs.com/parallel/core-parking-in-windows-server-2008-r2-a/228800354, pp. 1-5.*

(Continued)

*Primary Examiner* — Thuy Dao
*Assistant Examiner* — Stephen Berman (57) ABSTRACT

Systems and techniques are described for power-aware scheduling. One of the techniques includes monitoring execution of a plurality of groups of software threads executing on a physical machine, wherein the physical machine comprises a physical hardware platform that includes a plurality of processor packages having a plurality of package power states, wherein the plurality of package power states includes an independent package power state; obtaining a respective independent power state measure for each of the processor packages, wherein the independent power state measure provides a measure of a percentage of time the processor package spends in the independent package power state; and adjusting an allocation of the plurality of groups of software threads across the plurality of processor packages based in part on the independent power state measures for the packages.

14 Claims, 5 Drawing Sheets

(56) References Cited

U.S. PATENT DOCUMENTS

| | | | |
|---|---|---|---|
| 2010/0037038 A1* | 2/2010 | Bieswanger | G06F 1/3203 712/220 |
| 2011/0307730 A1 | 12/2011 | Marshall et al. | |
| 2012/0066688 A1* | 3/2012 | Chiang | G06F 9/5083 718/105 |
| 2014/0019989 A1* | 1/2014 | Suzuki | G06F 9/5088 718/105 |
| 2014/0189301 A1* | 7/2014 | Gorbatov | G06F 9/5094 712/30 |
| 2014/0189302 A1* | 7/2014 | Subbareddy | G06F 9/3885 712/30 |
| 2014/0189441 A1* | 7/2014 | Ishida | G06F 11/3006 714/47.3 |
| 2014/0337853 A1* | 11/2014 | Kim | G06F 9/5094 718/104 |
| 2016/0170470 A1* | 6/2016 | Kannan | G06F 1/3234 713/324 |

OTHER PUBLICATIONS

Wikipedia, "Hardware Performance Counter," Nov. 15, 2013, downloaded from the Wayback Machine Internet Archive at <url>: http://web.archive.org/web/20131115093450/http://en.wikipedia.org/wiki/Hardware_performance_counter on Sep. 1, 2016.*

Aydin et al., "Power-aware scheduling for periodic real-time tasks," 2004, IEEE Transactions on Computers, vol. 53, Issue 5, pp. 584-600.*

Li, "Performance Analysis of Power-Aware Task Scheduling Algorithms on Multiprocessor Computers with Dynamic Voltage and Speed," 2008, IEEE Transactions on Parallel and Distributed Systems, vol. 19, Issue 11, pp. 1484-1497.*

Choi et al., "Thermal-aware task scheduling at the system software level," 2007, ISLPED '07 Proceedings of the 2007 international symposium on Low power electronics and desig, pp. 213-218.*

* cited by examiner

POWER-AWARE SCHEDULING

BACKGROUND

This document relates to scheduling software processes or threads on physical machines having multiple processor packages.

The physical machines may have multiple virtual machines running thereon. A virtual machine is a software-based abstraction of a physical computer system. In general, a computer program that can be executed on a physical computer system can be executed in a virtual machine using virtualization software. Virtualization software is software that is logically interposed and interfaces with a virtual machine and a physical computer system. Each virtual machine is configured to execute an operating system, referred to herein as a guest OS, and applications. A physical computer system, referred to herein as a host machine or physical machine, can execute one or more virtual machines.

Each physical machine has a respective hardware platform on which the virtual machines execute. In some cases, the hardware platform for a given physical machine includes multiple processor packages that each include multiple processor cores, i.e., multiple independent central processing units, and workloads from the virtual machines executing on the host machine are distributed among the processor packages.

Additionally, at any given time during operation of the physical machine, each of the processor packages can be in a respective one of a specified set of package power states that define how much power is being consumed by the package. The package power states in the set of states range from states that consume a large amount of power to states that are power-efficient, i.e., states in which a larger proportion of the circuitry of the package is powered down. For some of the package power states, in order for a package to enter the state, every other package on the physical machine must be in a state that is at least as power-efficient as the particular state. That is, for a physical machine having two packages, as long as one package is in a first package power state, the other package generally cannot enter a different power state that is more power-efficient than the first package power state.

However, in some systems, one of the power states may be an independent package power state. An independent package power state is a state that a package can enter independent of the current power state of any other package on the physical machine. Thus, even if one or more packages on a physical machine are in a less power-efficient state than the independent package power state, another package on the physical machine may still enter the independent package power state.

SUMMARY

In general, one aspect of the subject matter described in this document can be embodied in a technique that includes monitoring execution of a plurality of groups of software threads executing on a physical machine, wherein the physical machine comprises a physical hardware platform that includes a plurality of processor packages having a plurality of package power states, wherein the plurality of package power states includes an independent package power state, and wherein each of the processor packages can enter the independent package power state independently of other processor packages in the plurality of processor packages; obtaining a respective independent power state measure for each of the processor packages, wherein the independent power state measure provides a measure of a percentage of time the processor package spends in the independent package power state; and adjusting an allocation of the plurality of groups of software threads across the plurality of processor packages based in part on the independent power state measures for the packages. Other embodiments of this aspect include corresponding systems, apparatus, and computer software encoded on a non-transitory machine readable storage medium.

These and other aspects can optionally include one or more of the following features. The technique can further include determining a respective load measure for each of the processor packages, wherein the load measure measures a load on the processor package; and adjusting the allocation based in part on the load measures. The technique can further include classifying each of the plurality of processor packages into a respective category based on the load measures and the independent power state measures. Adjusting the allocation can include adjusting the allocation based on the classifying. Classifying the plurality of processor packages can include: classifying each of the plurality of processor packages into a respective one of a high load category, a medium load category, a power-efficient category, a power-inefficient category, or a parked package category. Adjusting the allocation can include: migrating a first group of software threads from a first processor package that is in the high-load category to a second processor package that is in the power-inefficient category. Adjusting the allocation can include: migrating a first group of software threads from a first processor package that is in the power-inefficient category to a second processor package that is in the power-inefficient category, wherein the first processor package has a higher load measure than the second processor package. Adjusting the allocation can include: migrating a first group of software threads from a first processor package that is in the power-inefficient category to a second processor package that is in the medium load category. Adjusting the allocation can include: migrating a first group of software threads from a first processor package that is in the power-efficient category to a second processor package that is in the power-efficient category, wherein the first processor package has a lower load measure than the second processor package. A plurality of virtual machines can execute on the physical machine, wherein monitoring execution of a plurality of groups of software threads comprises monitoring execution of the virtual machines, and wherein adjusting an allocation of the groups of software threads comprises adjusting an allocation of the virtual machines across the plurality of processor packages.

Particular embodiments of the subject matter described in this document can be implemented so as to realize one or more of the following advantages. Workloads, e.g., workloads from virtual machines, can be scheduled on multi-package physical machines in a power-aware manner, i.e., in a manner that minimizes power consumption by the physical machine while maintaining acceptable levels of performance. In particular, the presence of a power-efficient independent package power state can be leveraged to schedule workloads on packages in a multi-package physical machine to increase the time spent in the independent package power state while maintaining acceptable performance.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes techniques for power-aware scheduling. In particular, virtual machines (VMs) may be scheduled on processor packages on a physical machine having multiple processor packages based in part on an independent power state measure for each package. The independent power state measure for a given package measures the amount of time the package spends in an independent package power state. The independent package power state is a power-efficient power state that any of the packages on the physical machine can enter independent of the current power state of any other package on the physical machine.

A process executing on the physical machine, e.g., a scheduler executing in the hypervisor of the physical machine, classifies each of the processor packages of the virtual machine into one of a pre-determined set of categories based in part on the independent power state measure for each package. The process then determines whether to adjust the workload on the packages, i.e., whether to migrate a VM from one package to another, based on the classification.

While this specification describes a computer system executing virtual machines as an example for illustration purposes, the techniques described in this specification can be applied to a computer system where no virtual machines are executing. In these cases, the techniques for power-aware scheduling described herein can be used to allocate workloads from other software processes or software threads that execute on the physical machine across the packages of the physical machine.

Figure 1:
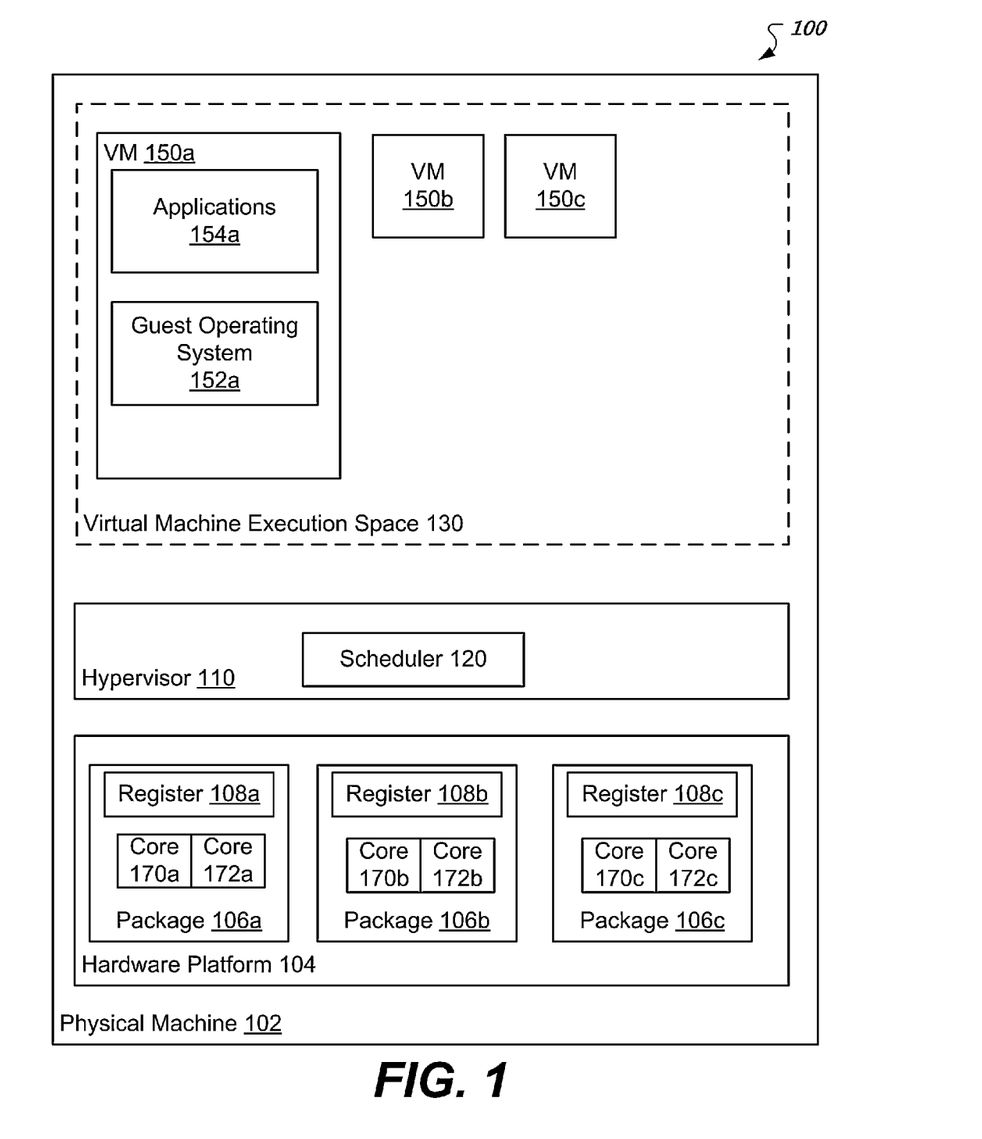
FIG. 1 shows an architecture for an example system that is configured to implement power-aware scheduling techniques.

FIG. 1 shows an architecture for an example system 100 that is configured to implement power-aware scheduling techniques. In the system 100, a physical machine 102 is configured to execute VMs 150a through 150c using a hypervisor 110. The physical machine 102 is a data processing apparatus that includes a hardware platform 104. The hardware platform 104 may include, e.g., a local storage device, a network adapter, memory, a processor, and so on.

In particular, the hardware platform 104 includes multiple processor packages 106a-106c. Each of the processor packages 106a-c includes multiple cores. In the illustrated example, processor package 106a includes two processor cores 170a and 172a, processor package 106b includes two processor cores 170b and 172b, and processor package 106c includes two processor cores 170c and 172c. Each processor core is an independent processing unit that reads and executes program instructions, e.g., program instructions for VMs scheduled on the processor core by a scheduler 120.

Additionally, at any given time during operation of the physical machine 102, each of the processor packages 106a-106c are in a respective one of a specified set of package power states that define how much power is being consumed by the package. The package power states in the set of power states depend on the processor architecture, but generally range from states that consume a large amount of power to states that are power-efficient, e.g., because more circuitry is powered-down when a package is in the power-efficient state.

Advantageously, the set of power states includes a power-efficient independent package power state. The independent package power state is a state that any of the packages 106a-106c can enter independent of the current power state of any other package on the physical machine. Thus, even if one or more packages on the physical machine 102 are in a less power-efficient state than the independent package power state, another package may still enter the independent package power state. For example, some INTEL® processors have multiple package power states that include a C2 state, a C3 state, and a C6 state, with the C2 state being more power-efficient than the C1 state, and the C3 and C6 states being more power-efficient than the C2 state. However, while the C3 and C6 states are more power-efficient, on some INTEL® processors, the C2 state is an independent package power state while the C3 and C6 states are not. That is, any of the packages on the physical machine can enter the C2 state independent of the current power state of the other packages on the physical machine. However, in order for a package to enter the C3 power state, each other package on the physical machine must be in a state that is at least as power-efficient as the C3 state.

The hypervisor 110 is a virtualization software layer that executes on the hardware platform 104. The hypervisor 110 manages a virtual machine execution space 130 within which one or more VMs, e.g., VMs 150a-150c, may be concurrently instantiated and executed. For each of the VMs 150a-150c, the hypervisor 106 manages a corresponding virtual hardware platform. Each virtual hardware platform includes emulated hardware, e.g., a virtual storage device, a virtual network adapter/interface, virtual memory, a virtual processor, and so on.

Each virtual machine managed by the hypervisor 110 executes a guest operating system, e.g., guest operating system 152a, that executes user applications, e.g., user applications 154a. The hypervisor 110 transforms input/output (I/O) requests from the guest operating systems to the corresponding virtual hardware platform into corresponding requests to the hardware platform 104.

The scheduler 120 schedules the VMs 150a-150c on the processor cores of the processor packages 106a-106c, e.g., on one or more of the cores 170a and 170b of processor package 106a. That is, the scheduler 120 selects processor cores to execute each of the VMs 150a-150c. Depending on the size of a given VM, execution of the VM can be scheduled on one core or on multiple cores and, consequently, on cores in one processor package or on cores in multiple processor packages. In some implementations, the scheduler 120 executes in the hypervisor 110. In some implementations, the physical machine 102 uses a Non-Uniform Memory Access (NUMA) architecture and the scheduler 120 is a NUMA scheduler, i.e., a scheduler that schedules workloads to optimize for the NUMA architecture used by the physical machine 102.

The scheduler 120 distributes the VMs across the cores in the processor packages 106a-106c based in part on an independent power state measure for each of the packages. The independent power state measure for a package measures how frequently the processor package has entered the independent power state. Scheduling VMs based in part on independent package power state measures is described below with reference to FIGS. 2 and 3.

The scheduler 120 can obtain the independent power state measures for each of the packages 106a-c by reading registers, e.g., machine specific registers (MSRs), on each package, e.g., the registers 108a-108c for processor packages 106a-106, respectively. The register for a given package provides values of the power state measure for each of the possible power states for the package. The scheduler 120 can read the registers 108a-108c at predetermined intervals, e.g., every two, three, or five seconds, to obtain the values of the independent power state measures for the corresponding packages 106a-106c.

Figure 2:
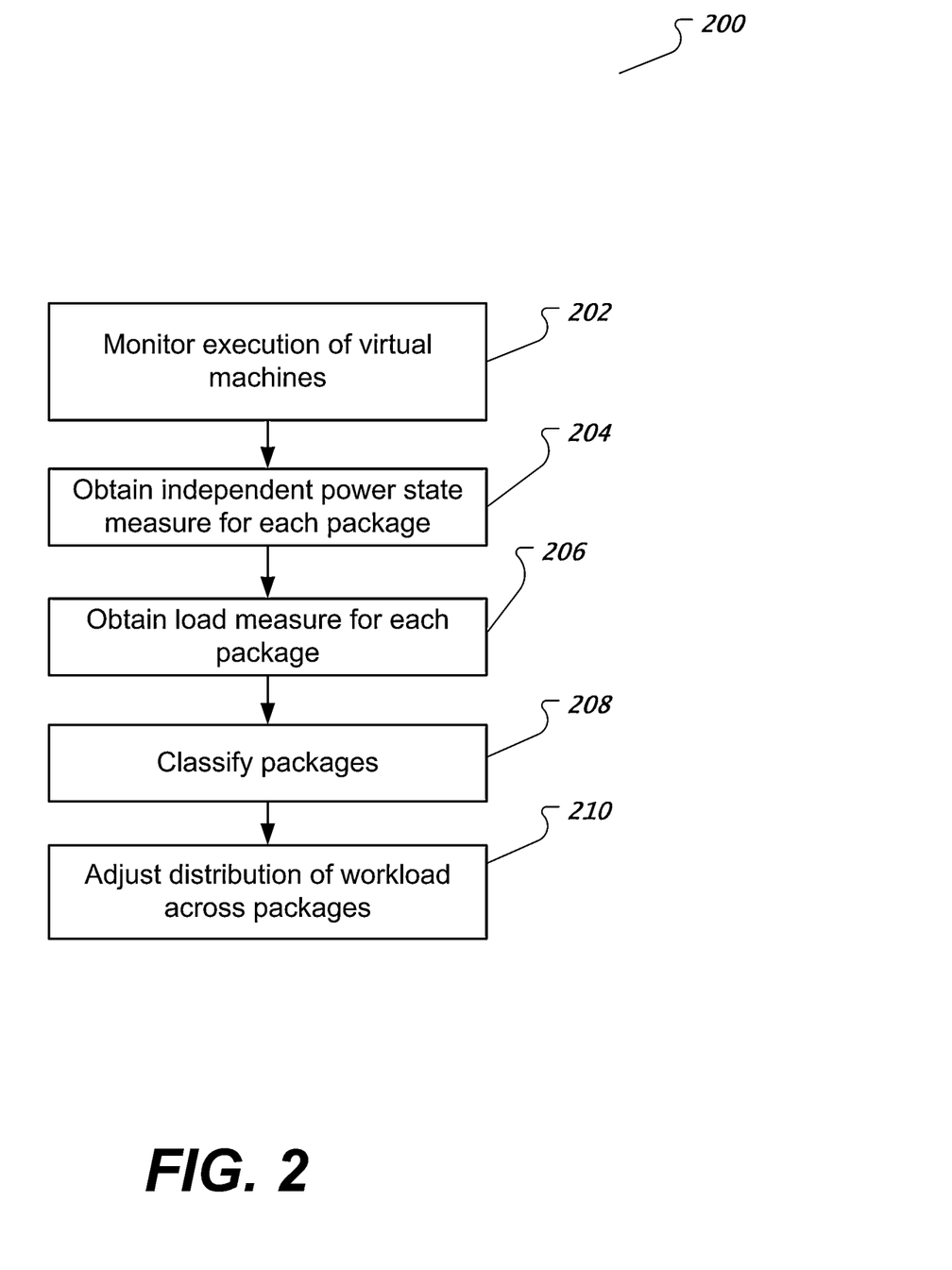
FIG. 2 is a flowchart of an example technique for power-aware scheduling.

FIG. 2 is a flowchart of an example technique 200 for power-aware workload scheduling. The example technique 200 is performed by a system of one or more computers. For example, the technique 200 may be performed by a physical machine configured to execute one or more virtual machines, e.g., the physical machine 102 of FIG. 1.

At step 202, the system monitors VMs executing on a physical machine that includes multiple processor packages. Workloads for the VMs are distributed among the multiple packages. For example, a hypervisor, e.g., the hypervisor 110 of FIG. 1, may monitor the VMs and a scheduler, e.g., the scheduler 120 of FIG. 1, executing in the hypervisor may schedule the VMs for execution by processor cores included in the multiple packages.

At step 204, the system obtains a respective independent power state measure for each package. For example, the scheduler can obtain the independent power state measure for a given package by reading a register on the package, e.g., the register 108a on the package 106a of FIG. 1. The independent power state measure is a measure of the percentage of time the package spends in the independent power state, i.e., the percentage of time the package has spent in the independent power state during a most-recent time window of specified size, e.g., a one second time window, a two second time window, or a five second time window. Optionally, the scheduler may obtain a power state measure for each of multiple power states by reading the register on the package. That is, in addition to obtaining the power state measure for the independent power state, the scheduler may also obtain measures for power states that are higher-power or lower-power states, i.e., other states that are more or less power-efficient than the independent power state.

At step 206, the system obtains a respective load measure for each package. The load measure for a given package measures a percentage of time that the package was in use during the most-recent time window.

At step 208, the system classifies the packages based on the load measures and the independent power state measures. That is, the scheduler assigns each of the packages to a respective category based in part on the independent power state measures. An example classification scheme is described in more detail below with reference to FIGS. 3 and 4.

At step 210, the system adjusts the distribution of the workload among the packages based on the classifications for the packages. That is, the scheduler determines whether adjusting the distribution of the workloads would decrease the power consumption of the physical machine while maintaining an acceptable level of performance or improving the level of performance and, if so, adjusts the distribution by moving certain VMs from one package to another. An example technique for adjusting the distribution of the workload is described below with reference to FIGS. 3A, 3B, and 4.

The system can perform the technique 200 at specified intervals during operation of the physical machine, e.g., every two, three, or five seconds, to determine whether to adjust the distribution of workload on the packages.

Figure 3A:
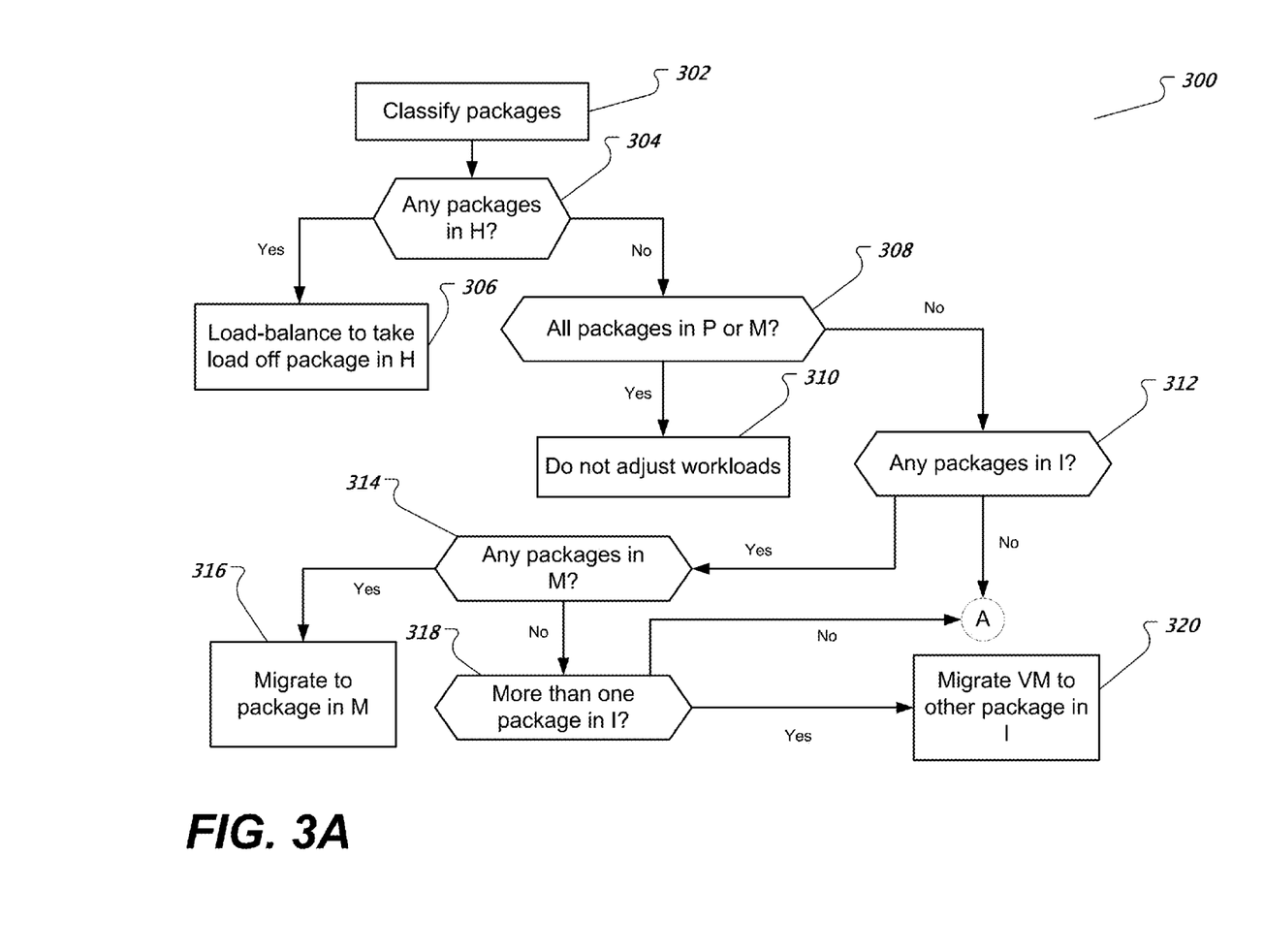
FIG. 3A is a flowchart of an example technique for adjusting workloads on processor packages.
Figure 3B:
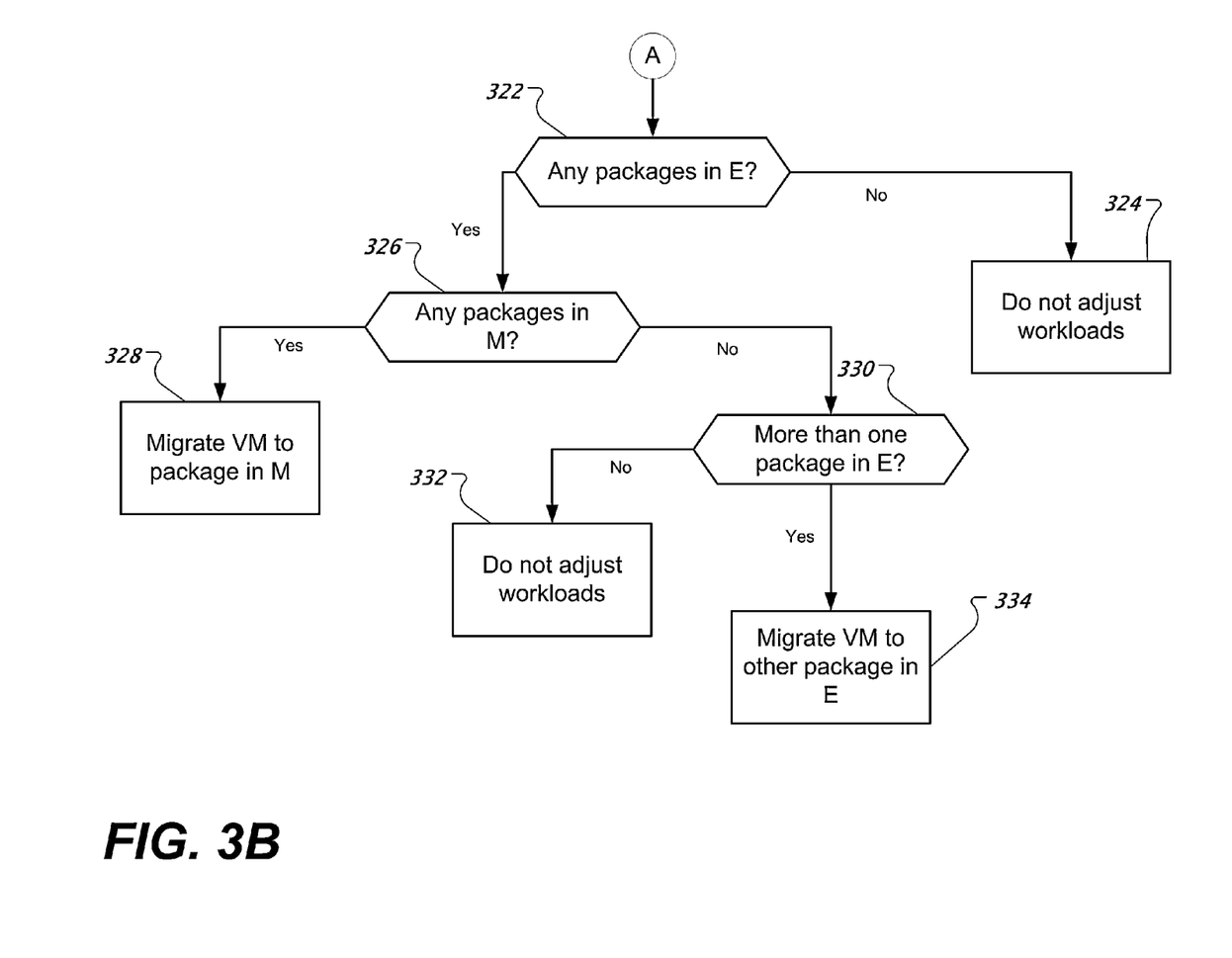
FIG. 3B is a flowchart of an example technique for adjusting workloads on processor packages.

FIGS. 3A and 3B are a flow chart for an example technique for adjusting workloads on processor packages. The example technique 300 is performed by a computer system. For example, the technique 300 may be performed by a scheduler executing in the hypervisor of a physical machine configured to execute one or more virtual machines, e.g., the physical machine 102 of FIG. 1.

Optionally, prior to performing step 302, the system may determine whether the physical machine has been in package power states that are more power-efficient than the independent power state for more than a threshold percentage of time during the most-recent time window. If the system has been in the more-efficient states for more than the threshold percentage of time, e.g., if the package was in the states for 30% or more of the most-recent time window, the system may determine that the physical machine is already power-efficient and refrain from performing the technique 300.

At step 302, the system classifies each of the packages on the physical machine using the load measures and the independent power state measures for the packages into one of a number of categories. An example classification scheme that uses five categories is described below, however, classification schemes having any number of categories may be used.

In the five category classification scheme, the system classifies each package into one of the following categories: a high load category (denoted in this specification as category H), a medium load category (denoted in this specification as category M), a power-efficient category (denoted in this specification as category E), a power-inefficient category (denoted in this specification as category I), and a parked package category (denoted in this specification as category P).

The system classifies a package into category H if the package has a high load measure and a low independent power state measure. A load measure may be considered to be a high load measure, for example, if the measure is at least 80%. An independent power state measure may be considered to be a low independent power state measure, for example, if the measure is 30% or lower. Optionally, the system may classify the package into category H if the package has a high load measure without considering whether the independent power measure for the package is low.

The system classifies a package into category M if the package has a medium load measure. A load measure may be considered to be a medium load measure, for example, if the load measure is between 40% and 80%. That is, the system classifies packages having a medium load measure into category M irrespective of their independent power state measure.

The system classifies a package into category E if the package has a low load measure and a high independent power state measure. A load measure may be considered to be a low load measure, for example, if the measure is 40% or lower. An independent power state measure may be considered to be a high independent power state measure, for example, if the measure is greater than 30% or greater than 40%.

The system classifies a package into category I if the package has a low load measure and a low independent power state measure.

The system classifies a package into category P if the package has an almost zero load measure and a peak independent power state measure. An almost zero load measure may be, e.g., a measure that is below 2%. An independent power state measure may be considered to be a peak independent power state measure, for example, if the measure is 95% or greater.

At step 304, the system determines if any of the packages are in category H.

At step 306, if any of the packages are in category H, the system load-balances to take load off one of the packages in category H. That is, the system migrates one or more VMs away from the package in category H that has the highest load measure to a different package on the physical machine, i.e., the system schedules the VMs for execution by cores in a different package on the physical machine. If more than one VM is being executed by the cores in the package in category H having the highest load measure, the system can select the VM to be migrated using conventional load balancing techniques.

The system migrates the VMs using a load balancing technique. For example, if any of the other packages are in category I, the system migrates one or more VMs to the package in category I having the highest load measure. If no packages are in category I, the system migrates the workload to the package in category E having the lowest independent power state measure. If no other packages are in category E, the system can migrate the workload to a package in category P or category M. If all of the packages are in category H, the system may determine that no load balancing or increased power-efficiency is possible and refrain from adjusting the distribution of the workload.

At step 308, if none of the packages are in category H, the system determines whether all of the packages are in category P or category M.

At step 310, if all of the packages are in category P or category M, the system does not adjust the workload on any of the packages. That is, the system determines that the physical machine is already in a power-efficient state and that no adjustment to the distribution of the workload among the packages is necessary.

At step 312, if not all of the packages are in category P or category M, the system determines whether any of the packages are in category I. Generally, because packages in category I have a low load measure and a low independent package measure, i.e., are frequently in a lower power-efficiency state than the independent package state despite being lightly loaded, reassigning workloads from packages in category I is likely to result in improved power efficiency. If there are no packages in category I, the system proceeds to step 322.

At step 314, if any of the packages are in category I, the system determines whether any of the packages are in category M. At step 316, if there is a package in category M, the system migrates a VM from a package in category I to a package in category M. In particular, if more than one package is in category I, the system migrates a VM from the category I package having the lowest load measure to a category M package. Alternatively, the system may migrate the VM from the category I package that has the lowest product between its load measure and its independent power state measure. If there is more than one category M package, the system migrates the VM to the category M package having the lowest load measure. If there is more than one VM scheduled on a given package, the system can select the VM that has the highest load for migration, i.e., the VM that has used the cores in the package the most during the recent time window.

At step 318, if there are no packages in category M, the system determines whether there is more than one package in category I. At step 320, if there is more than one package in category I, the system migrates a VM from the category I package having the lowest load measure to the category I package having the highest load measure. Alternatively, the system may migrate a VM from the category I package that has the lowest product between its load measure and its independent power state measure to the category I package having the highest product between its load measure and its independent power state measure. If there is only package in category I, the system proceeds to step 322.

At step 322, the system determines whether there are any packages in category E. At step 324, if there are no packages in category E, the system determines not to adjust the workloads on the packages.

At step 326, if there are any packages in category E, the system determines whether there are any packages in category M. At step 328, if there is a package in category M, the system migrates a VM from the package having the lowest load measure in category E to a package in category M. At step 330, if there is not a package in category M, the system determines whether there is more than one package in category E.

At step 332, if there is only one package in category E, the system determines not to adjust the workloads on the packages. At step 334, if there are multiple packages in category E, the system migrates a VM from the package in category E having the lowest load to the package in category E having the highest load.

Figure 4:
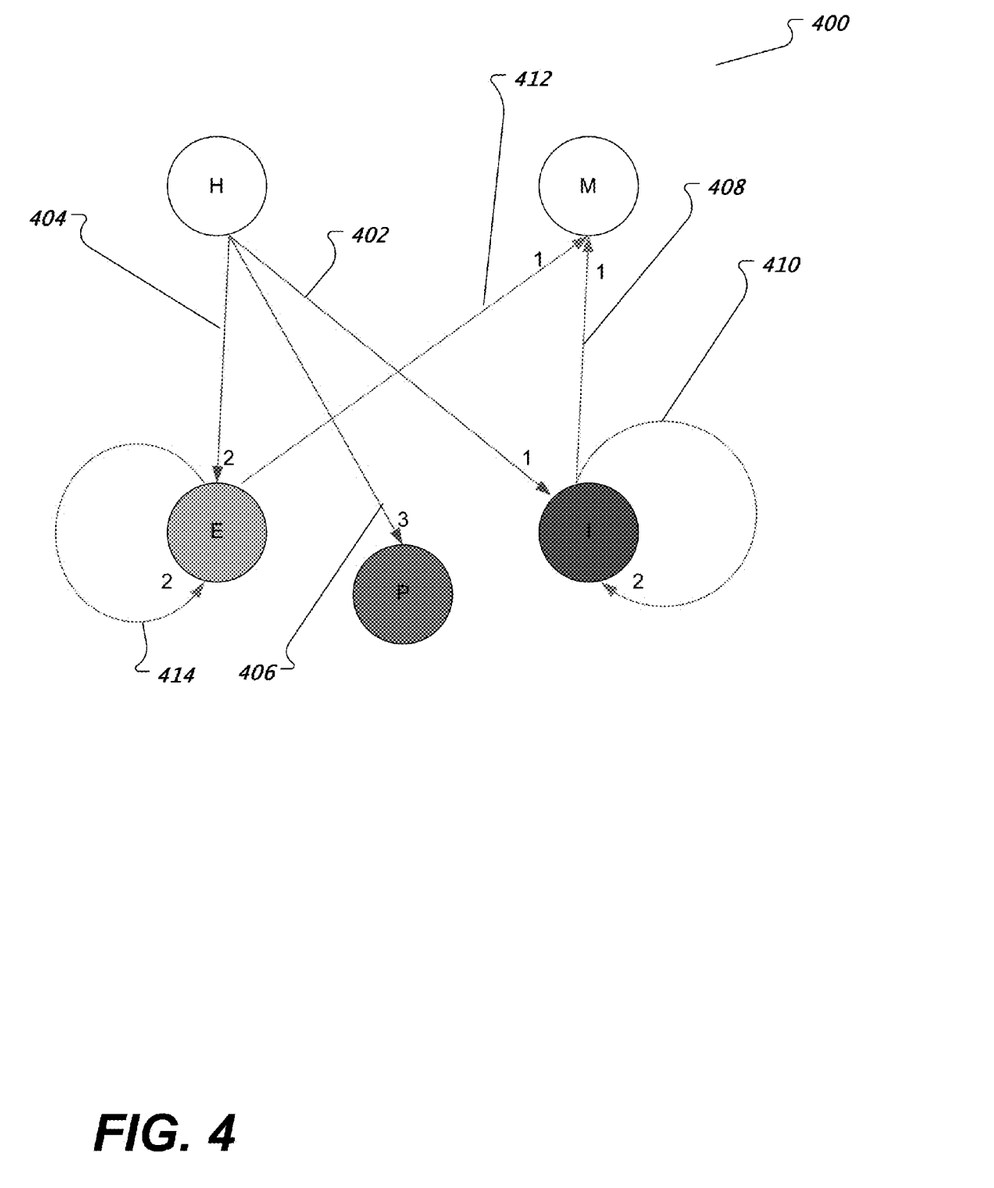
FIG. 4 is a state diagram showing possible migrations using power-aware scheduling.

FIG. 4 shows a state diagram 400 of potential VM migrations using power-aware scheduling. In particular, the state diagram 400 shows potential migrations that may be performed by a system using the technique 300 of FIG. 3. Each potential migration shown in the state diagram 400 is a potential migration of a VM from one package on a physical machine to another package on the physical machine.

If there are any packages in category H, the system attempts a migration 402 that migrates a VM from a package in category H to a package in category I. The system can attempt to perform a migration by determining whether there is another package on the physical machine that is in the category required for the migration, e.g., whether there is a package in category I in order to perform the migration 402. If the system cannot perform the migration 402, the system attempts a migration 404 from a package in category H to a package in category E. If the system cannot perform the migration 404, the system attempts a migration 406 from a package in category H to a package in category P.

If there are no packages in category H and there is at least one package in category I, the system attempts a migration 408 from a package in category I, e.g., from the category I package having the lowest load, to a package in category M. If the system cannot perform the migration 408, the system attempts a migration 410 from one package in category I to another package in category I, e.g., from the category I package having the lowest load to the category I package having the highest load.

If the system cannot perform the migrations 408 and 410 and there is at least one package in category E, the system attempts a migration 412 from a package in category E, e.g., the package having the lowest load measure in category E, to a package in category M. If the system cannot perform the migration 412, the system attempts a migration 414 from one package in category E to another package in category E, e.g., from the package in category E having the lowest load to the package in category E having the highest load.

While the above description describes allocating VMs across processor packages, the techniques described above can be used to allocate workloads from any software process or other group of one or more software threads that executes on a physical machine having multiple processor packages that can enter an independent package power state in a power-aware and power-efficient manner. That is, the techniques described above can be used to migrate any group of user or non-pinned system threads from one package to another on a physical machine to minimize power consumption by the physical machine while maintaining acceptable levels of performance. Instead of migrating a virtual machine from one processor package to another as described above, the techniques would be used to migrate a software process or other group of software threads from one processor package to another.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
monitoring execution of a plurality of groups of software threads executing on a physical machine, wherein the physical machine comprises a physical hardware platform that includes a plurality of processor packages, the processor packages each having a plurality of processor cores and having a plurality of package power states, wherein the plurality of package power states includes an independent package power state, and wherein each of the processor packages can enter the independent package power state independently of other processor packages in the plurality of processor packages;
obtaining a respective independent power state measure for each of the processor packages, wherein the independent power state measure provides a measure of a percentage of time the processor package spends in the independent package power state;
obtaining a respective load measure for each of the processor packages, wherein the load measure provides a measure of a percentage of time the processor package was in use during a time window;
adjusting an allocation of the plurality of groups of software threads across the plurality of processor packages based in part on the independent power state measures for the packages and the load measures for the packages; and
classifying each of the plurality of processor packages into a respective category based on the load measures and the independent power state measures.

2. The method of claim 1, wherein classifying the plurality of processor packages comprises:
classifying each of the plurality of processor packages into a respective one of a high load category, a medium load category, a power-efficient category, a power-inefficient category, or a parked package category.

3. The method of claim 2, wherein adjusting the allocation comprises:
migrating a first group of software threads from a first processor package that is in the high-load category to a second processor package that is in the power-inefficient category.

4. The method of claim 2, wherein adjusting the allocation comprises:
migrating a first group of software threads from a first processor package that is in the power-inefficient category to a second processor package that is in the power-inefficient category, wherein the first processor package has a higher load measure than the second processor package.

5. The method of claim 2, wherein adjusting the allocation comprises:
migrating a first group of software threads from a first processor package that is in the power-inefficient category to a second processor package that is in the medium load category.

6. The method of claim 2, wherein adjusting the allocation comprises:
migrating a first group of software threads from a first processor package that is in the power-efficient category to a second processor package that is in the power-efficient category, wherein the first processor package has a lower load measure than the second processor package.

7. The method of claim 1, wherein a plurality of virtual machines execute on the physical machine, wherein monitoring execution of a plurality of groups of software threads comprises monitoring execution of the virtual machines, and wherein adjusting an allocation of the groups of software threads comprises adjusting an allocation of the virtual machines across the plurality of processor packages.

8. The method of claim 1, wherein obtaining a respective independent power state measure for a processor package comprises reading a register on the processor package.

9. A system comprising one or more computers and one or more storage devices storing instructions that when executed by the one or more computers cause the one or more computers to perform operations comprising:
monitoring execution of a plurality of groups of software threads executing on a physical machine, wherein the physical machine comprises a physical hardware platform that includes a plurality of processor packages, the processor packages each having a plurality of processor cores and having a plurality of package power states, wherein the plurality of package power states includes an independent package power state, and wherein each of the processor packages can enter the independent package power state independently of other processor packages in the plurality of processor packages;
obtaining a respective independent power state measure for each of the processor packages, wherein the independent power state measure provides a measure of a percentage of time the processor package spends in the independent package power state;
obtaining a respective load measure for each of the processor packages, wherein the load measure provides a measure of a percentage of time the processor package was in use during a time window;
adjusting an allocation of the plurality of groups of software threads across the plurality of processor packages based in part on the independent power state measures for the packages and the load measures for the packages; and
classifying each of the plurality of processor packages into a respective category based on the load measures and the independent power state measures.

10. The system of claim 9, wherein adjusting the allocation comprises adjusting the allocation based on the classifying.

11. The system of claim 9, wherein a plurality of virtual machines execute on the physical machine, wherein monitoring execution of a plurality of groups of software threads comprises monitoring execution of the virtual machines, and wherein adjusting an allocation of the groups of software threads comprises adjusting an allocation of the virtual machines across the plurality of processor packages.

12. A non-transitory machine readable storage medium storing instructions that when executed by one or more computers cause the one or more computers to perform operations comprising:
monitoring execution of a plurality of groups of software threads executing on a physical machine, wherein the physical machine comprises a physical hardware platform that includes a plurality of processor packages, the processor packages each having a plurality of processor cores and having a plurality of package power states, wherein the plurality of package power states includes an independent package power state, and wherein each of the processor packages can enter the independent package power state independently of other processor packages in the plurality of processor packages;
obtaining a respective independent power state measure for each of the processor packages, wherein the independent power state measure provides a measure of a percentage of time the processor package spends in the independent package power state;
obtaining a respective load measure for each of the processor packages, wherein the load measure provides a measure of a percentage of time the processor package was in use during a time window; and
adjusting an allocation of the plurality of groups of software threads across the plurality of processor packages based in part on the independent power state measures for the packages and the load measures for the packages; and
classifying each of the plurality of processor packages into a respective category based on the load measures and the independent power state measures.

13. The machine readable storage medium of claim 12, wherein adjusting the allocation comprises adjusting the allocation based on the classifying.

14. The machine readable storage medium of claim 12, wherein a plurality of virtual machines execute on the physical machine, wherein monitoring execution of a plurality of groups of software threads comprises monitoring execution of the virtual machines, and wherein adjusting an allocation of the groups of software threads comprises adjusting an allocation of the virtual machines across the plurality of processor packages.

* * * * *